Nov. 20, 1928.
K. ZWART
1,692,363
SIGNAL MEANS FOR BOILING LIQUIDS
Filed April 19, 1928
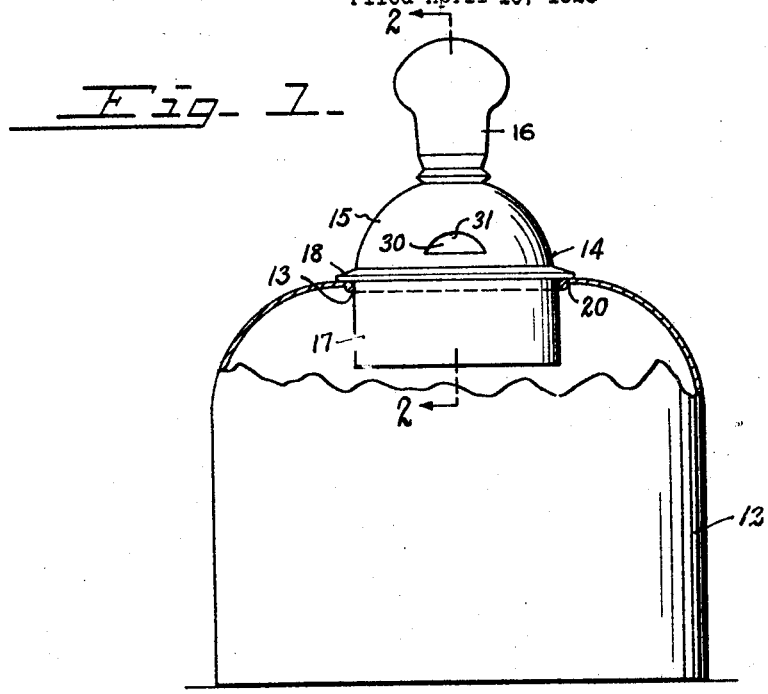
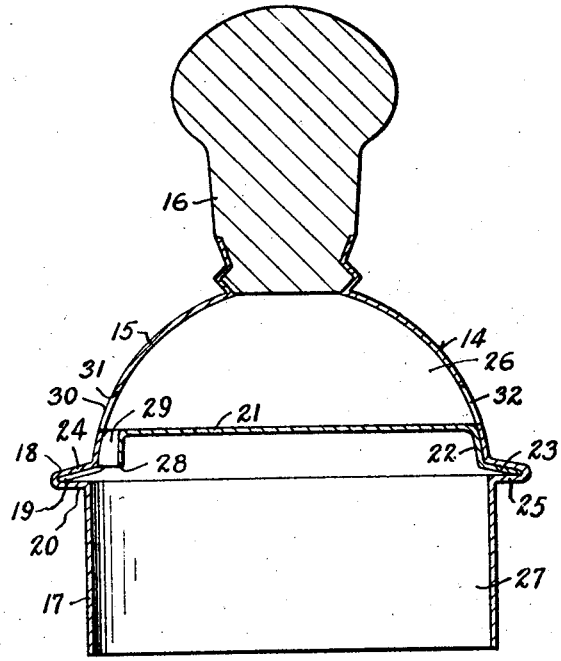
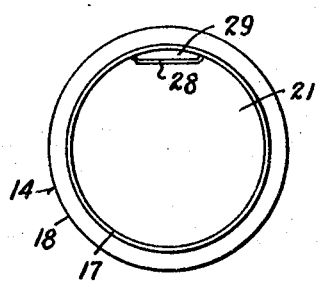
INVENTOR.
Klaas Zwart,
By W. C. Karel
his Attorney.

Patented Nov. 20, 1928.

1,692,363

UNITED STATES PATENT OFFICE.

KLAAS ZWART, OF SHEBOYGAN FALLS, WISCONSIN.

SIGNAL MEANS FOR BOILING LIQUIDS.

Application filed April 19, 1928. Serial No. 271,191.

It is the object of my invention to provide a signal means for utensils used in cooking, whereby the attendant will be notified, when the liquid contained in the utensil has reached the boiling point. A further object of my invention is the novel arrangements of parts to create a whistling noise, due to the pressure of steam in my device.

It is the general practice in boiling liquids for home use, to either continually watch the same, or allow the liquids to boil unnecessarily long, causing a waste of fuel, and often damaging results to the liquid and also to the utensil.

My invention provides means whereby the attendant can attend to other duties and as soon as the liquid reaches the boiling point and emits steam, his attention is attracted, due to the steam passing through my improved device, creating a whistling noise. The attendant is then aware that the liquid has reached the boiling point without the continued annoyance of inspection. The amount of fuel used to bring a liquid to a boiling point is reduced to a minimum by the use of my device.

The invention will be further readily understood from the following description and claims, and from the drawings, in which latter:

Fig. 1 is a side elevation of a utensil with my invention applied thereto.

Fig. 2 is an axial section of the same, taken on the line 2—2 of Fig. 1; and

Fig. 3 is a bottom view of my device.

I have shown my invention applied to a container 12, but it is obvious that it can be used with a variety of vessels. The container 12 has the usual opening 13, in which my device, which forms the cover 14 is arranged to be received.

The cover comprises a dome 15 to which a handle 16 is attached. The dome 15 has a peripheral flange 17 depending therefrom, arranged to fit the opening 13 in the container. The base of the dome is pressed outwardly as at 18 forming a rabbet 19 in the inner periphery of the cover and forming an outer annular shoulder 20, to limit inward movement of the cover. A plate 21 has a depending flange forming a wall 22 and an outwardly extending flange 23 received in the rabbet 19 and held in position by the walls 24, 25, of the outwardly extending portion 18, dividing the cover into an upper section 26 and a lower section 27.

A portion of the flange 23 is cut away and the wall 22 at this point is bent at right angles to the plate 21 forming an edge 28 and a passage 29 between the wall of the plate and the wall of the cover. The dome 15 is provided with an opening 30 directly above the passage 29. The upper edge 31 is in axial line with the passage 29.

Application of heat to the base of the container will cause the liquid contained therein to rise in temperature until the liquid reaches its boiling point, whereupon steam will rise from the liquid and collect in the section 27. The steam thus collected will be forced through the passage 29 by the pressure of steam rising from the liquid and contact the edge 31 of the opening in the dome. This edge will cause a separation of the steam and create a whistling noise. The attendant will then be aware that the liquid in the container has reached the boiling point.

I provide an additional opening 32 in the dome to permit such steam as may collect therein to pass to the atmosphere.

My invention may be applied to the spout of larger containers wherein the action would be the same, or to any other suitable opening in the container.

My device is simple in construction and provides efficient means for attracting attention when the liquid in the container reaches its boiling point.

Having thus fully described my invention, what I claim as new, and desire to secure by Letters Patent, is:

1. A signal means incorporated in a cover for a utensil comprising a dome, an annular flange depending therefrom, a plate interposed between said dome and said flange, dividing said cover into an upper section and a lower section, an opening adjacent to the wall of said dome in said plate for forming a passage between said sections, an opening in said dome having an upper edge in axial line with said passage, whereby steam in said lower section will pass through said passage and contact said upper edge of said opening in said dome.

2. In a signal means for a utensil comprising a cover divided into an upper section and a lower section, a plate between said sections, said plate having a depending wall spaced from the wall of said cover forming a passage between said sections, for permitting steam to pass from said lower section to said upper section, said upper section having a plurality of openings in close proximity to said plate, the upper edge of one of said openings in axial line with said passage, arranged to be contacted by said steam passing from said lower section to said upper section.

3. A signal means incorporated in a cover for a utensil comprising an annular wall converging at its upper end, an annular groove in said wall, spaced from the lower end of said wall, a plate positioned in said groove dividing said cover into an upper section and a lower section, a passage between said plate and said wall, an opening in said upper converging section adjacent to said plate the upper edge of said opening in axial line with said passage for contact of steam passing from said lower section to said upper section.

In testimony whereof, I have hereunto signed my name.

KLAAS ZWART.